(No Model.)

G. F. WATERS.
FLESH RUBBING APPARATUS.

No. 269,247.  Patented Dec. 19, 1882.

Witnesses.
Fred A. Powell
Bennie J. Noyes.

Inventor
George F. Waters
by Crosby & Gregory
attys.

UNITED STATES PATENT OFFICE.

GEORGE F. WATERS, OF BOSTON, MASSACHUSETTS.

FLESH-RUBBING APPARATUS.

SPECIFICATION forming part of Letters Patent No. 269,247, dated December 19, 1882.

Application filed August 28, 1882. (No model.)

*To all whom it may concern:*

Be it known that I, GEORGE F. WATERS, of Boston, county of Suffolk, and State of Massachusetts, have invented an Improvement in Flesh-Rubbing Apparatus, of which the following description, in connection with the accompanying drawings, is a specification.

Flesh-rubbers composed of vegetable fiber have a certain electrical effect upon the system, while those of animal fiber—such as wool, bristles, or hair—have the opposite effect, and it is consequently sometimes desirable to employ one and sometimes the other of the said materials.

My invention, having for its object to produce a cheap and convenient flesh-rubbing device capable of producing either of the above-mentioned effects, as may be desired, is embodied in a flexible strip of fabric composed mainly of vegetable fiber, it being shown in this instance as of Manila twine knit into a band or strip of convenient width, the stitches being properly made to produce cross-ribs. The said strip, made of suitable length, is narrowed at its ends, the narrowing being preferably done at the middle of the strip to give it a better finish at the edges, and at the ends of the narrowed portion loops are made, which serve as handles for manipulating the band. One side of the said strip is provided with animal fiber, shown as a yarn of twisted hair introduced into the ribs of the knitting either in the process of knitting or being drawn in afterward. In using this side of the band both the animal and vegetable fiber touch the skin; but in using the other side the skin is touched only by the vegetable fiber.

Figure 1:
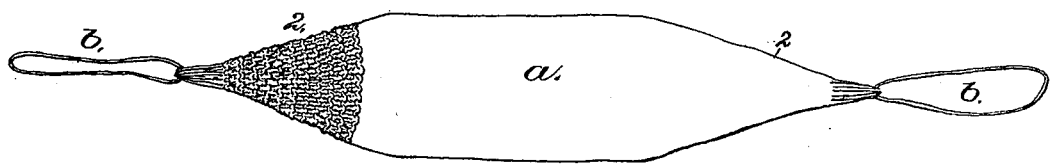
Figure 2:
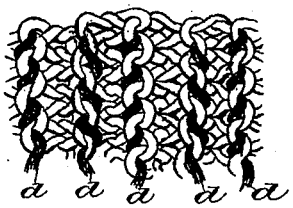

Figure 1 is a view of the flesh-rubbing device, and Fig. 2 a detail, showing a portion of the stitches of the band provided with the animal fiber.

The flesh-rubbing device consists of a flexible band, $a$, of suitable length and width, composed mainly of vegetable fiber, preferably Manila or other coarse twine knit so as to produce cross-ribs, as shown, the said bands being narrowed near its ends, as at 2, to give it a tapering shape. The extreme ends are provided with loops $b$, which serve as handles for drawing the band over the body. One side of the said band is provided with animal fiber, it being shown in Fig. 2 as a yarn, $d$, of twisted hair, worked into the loops of the knit Manila twine. The said animal fiber passes over the projecting portions of the loops in such a manner as to almost wholly prevent the said loops or vegetable portion of the fabric from coming in contact with a surface over which the said side of the band is drawn, the animal fiber thus constituting the effective rubbing-surface, although the vegetable fiber also touches the skin lightly. In addition to the different electrical effects referred to, the two opposite surfaces of the band have a different mechanical effect upon the flesh.

I claim—

1. The herein-described flesh-rubbing device, consisting of a flexible band composed of knit vegetable fibrous material tapered at its ends and provided with handles, combined with a yarn of animal fibrous material worked into the loops upon one face of the band, as described, whereby one side or rubbing-face of the band is of vegetable and the other of combined animal and vegetable fiber, substantially as and for the purpose set forth.

2. The band $a$, of knit Manila twine, narrowed or tapered at its ends, combined with handles $b$, connected with the said ends, substantially as described.

In testimony whereof I have signed my name to this specification in the presence of two subscribing witnesses.

GEO. F. WATERS.

Witnesses:
JOS. P. LIVERMORE,
BERNICE J. NOYES.